US009862349B2

(12) United States Patent
Fujiwara et al.

(10) Patent No.: US 9,862,349 B2
(45) Date of Patent: Jan. 9, 2018

(54) VEHICLE CURTAIN AIRBAG DEVICE

(71) Applicant: Toyota Jidosha Kabushiki Kaisha, Toyota-shi, Aichi-ken (JP)

(72) Inventors: Yusuke Fujiwara, Toyota (JP); Atsushi Nakashima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 56 days.

(21) Appl. No.: 15/061,079

(22) Filed: Mar. 4, 2016

(65) Prior Publication Data
US 2016/0297394 A1  Oct. 13, 2016

(30) Foreign Application Priority Data

Apr. 9, 2015 (JP) .................................. 2015-079802

(51) Int. Cl.
*B60R 21/232* (2011.01)
*B60R 21/237* (2006.01)
*B60R 21/213* (2011.01)
*B60R 21/233* (2006.01)

(52) U.S. Cl.
CPC .......... *B60R 21/232* (2013.01); *B60R 21/237* (2013.01)

(58) Field of Classification Search
CPC ........................ B60R 21/232; B60R 21/237
See application file for complete search history.

(56) References Cited

U.S. PATENT DOCUMENTS

| | | | | |
|---|---|---|---|---|
| 6,332,628 | B1 * | 12/2001 | Tschaeschke | B60R 21/232 280/728.2 |
| 6,361,068 | B1 * | 3/2002 | Stein | B60R 21/232 280/730.2 |
| 6,565,118 | B2 * | 5/2003 | Bakhsh | B60R 21/232 280/730.2 |
| 7,762,578 | B2 * | 7/2010 | Dix | B60R 21/232 280/730.2 |
| 7,823,922 | B2 * | 11/2010 | Mitchell | B60R 21/232 280/730.2 |
| 8,579,323 | B2 * | 11/2013 | Kato | B60R 21/213 280/729 |

(Continued)

FOREIGN PATENT DOCUMENTS

| | | |
|---|---|---|
| JP | 2004-256000 A | 9/2004 |
| JP | 2006-088919 A | 4/2006 |

(Continued)

*Primary Examiner* — Paul N Dickson
*Assistant Examiner* — Joselynn Y Sliteris
(74) *Attorney, Agent, or Firm* — Dinsmore & Shohl LLP

(57) ABSTRACT

A vehicle curtain airbag device has a curtain airbag. The curtain airbag is configured such that: a front end side is Z-folded toward a vehicle width direction inner side, the curtain airbag is further folded top-to-bottom, and, in the stowed state, a front end portion at the Z-folded region is covered by a rear end portion of a front pillar garnish; a corner portion at a front end side and an upper end side of the front side sub chamber is formed in a circular arc shape; and in a mid-deployment state, a front end side and an upper end side of the Z-folded region are covered, the corner portion overlaps a vehicle width direction outer side of the rear end portion, and a rear end of the corner portion is positioned further to a vehicle rear side than a rear end of the front pillar garnish.

2 Claims, 10 Drawing Sheets

(56) References Cited

U.S. PATENT DOCUMENTS

| | | | |
|---|---|---|---|
| 8,894,094 B2* | 11/2014 | Wang | B60R 21/232 |
| | | | 280/730.2 |
| 9,114,777 B2* | 8/2015 | Fukawatase | B60R 21/232 |
| 9,566,935 B2* | 2/2017 | Hicken | B60R 21/232 |
| 2012/0256401 A1 | 10/2012 | Kato et al. | |
| 2014/0239619 A1 | 8/2014 | Fukawatase et al. | |
| 2015/0307054 A1 | 10/2015 | Fukawatase et al. | |

FOREIGN PATENT DOCUMENTS

| | | |
|---|---|---|
| JP | 2012-218619 A | 11/2012 |
| JP | 2014-162313 A | 9/2014 |

* cited by examiner

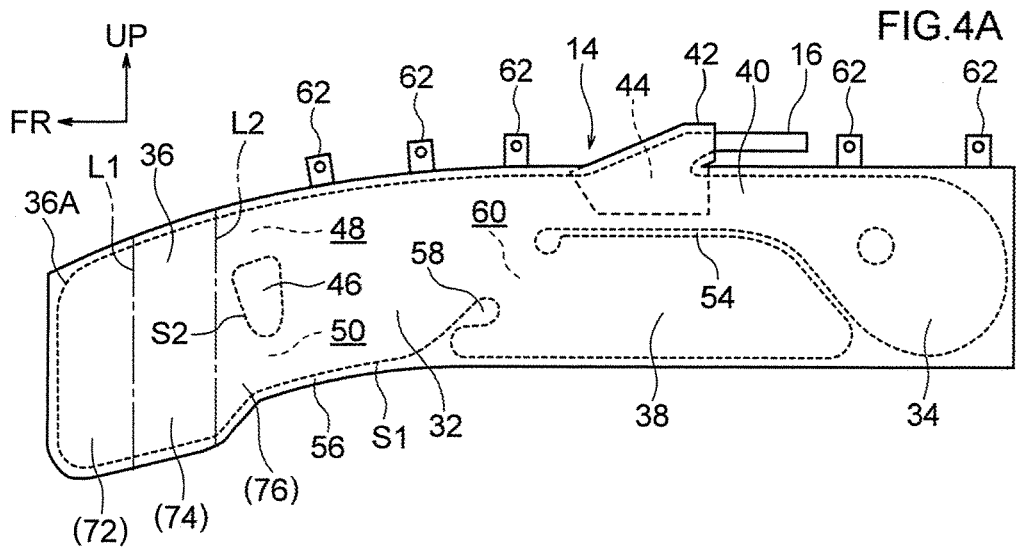
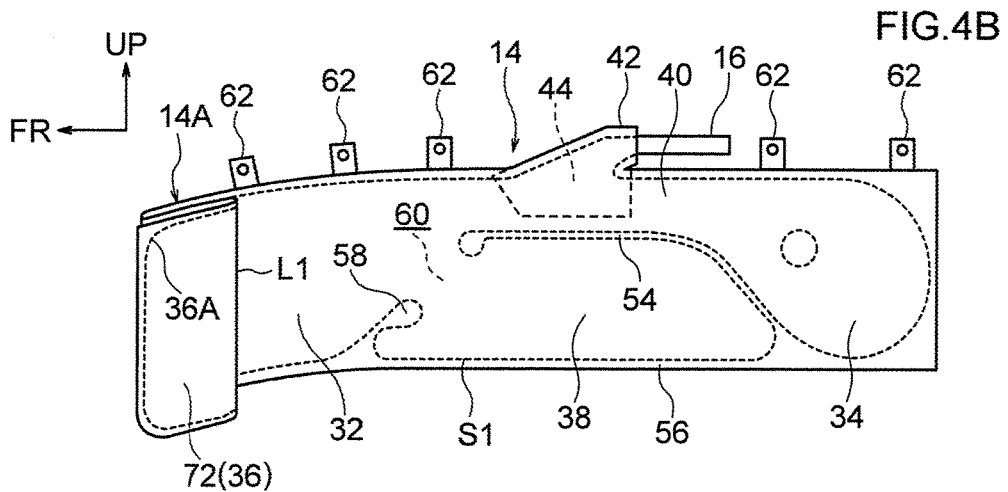
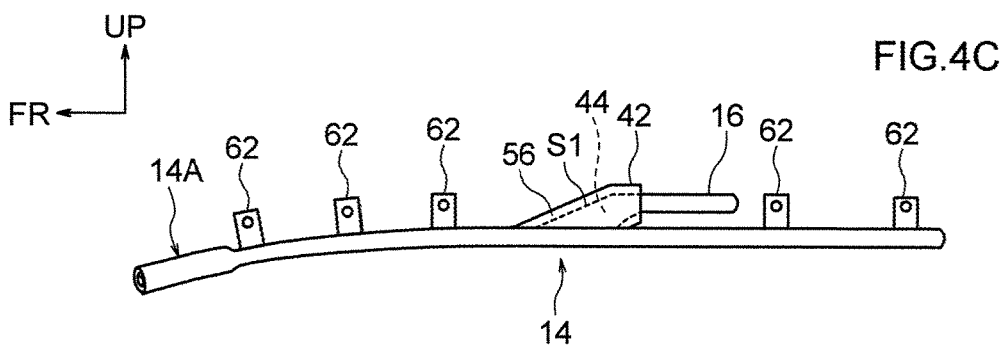

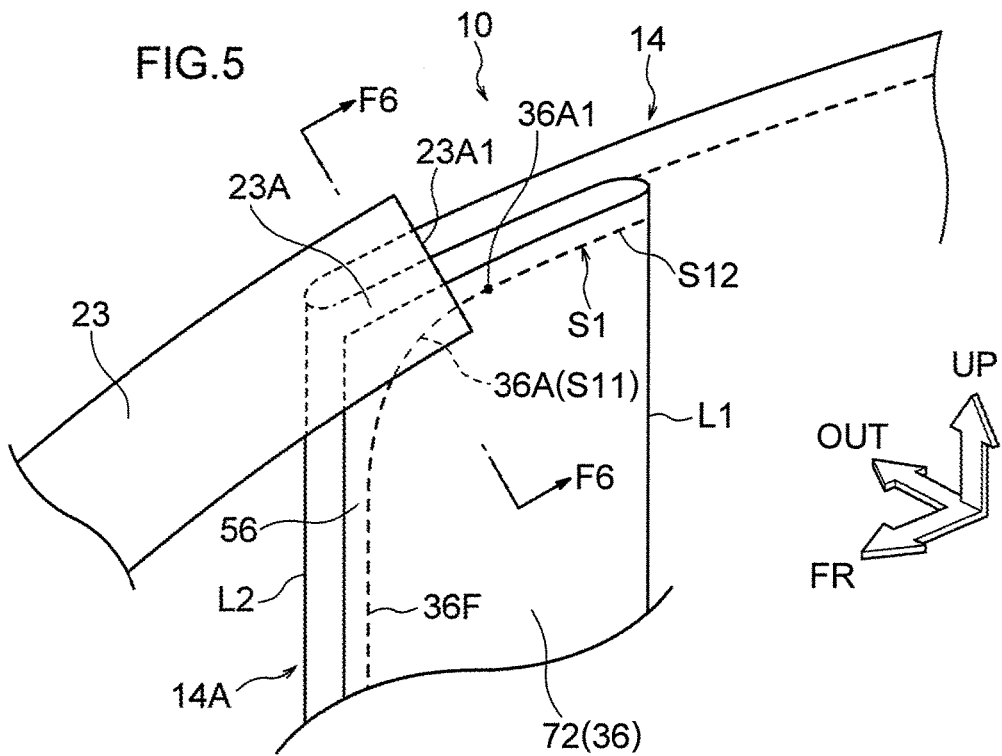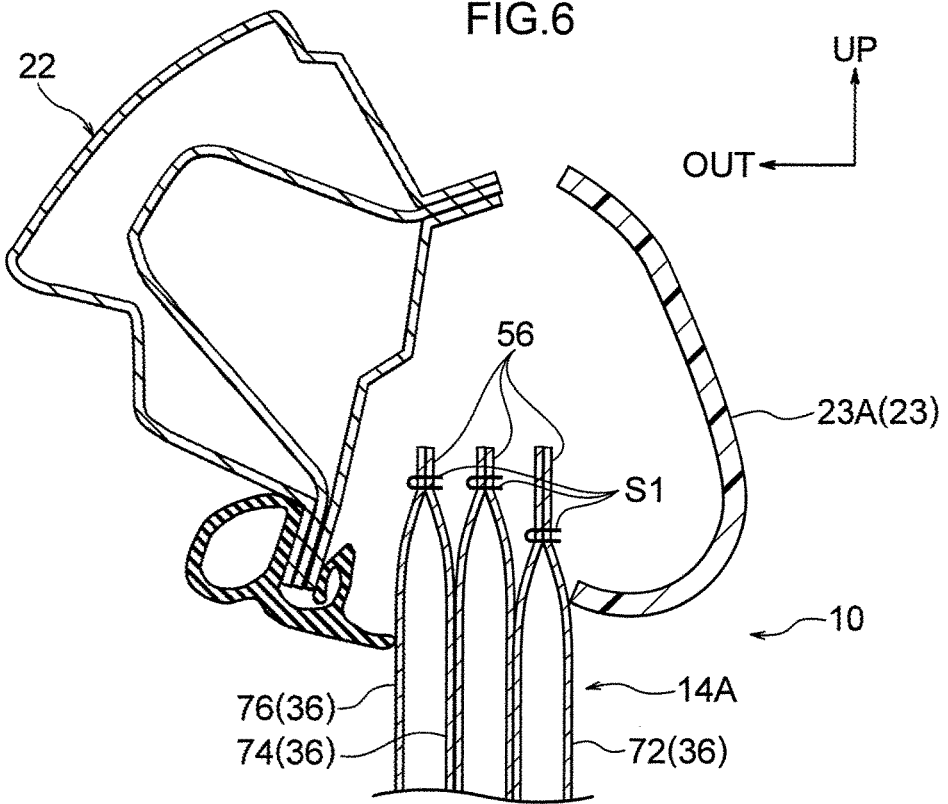

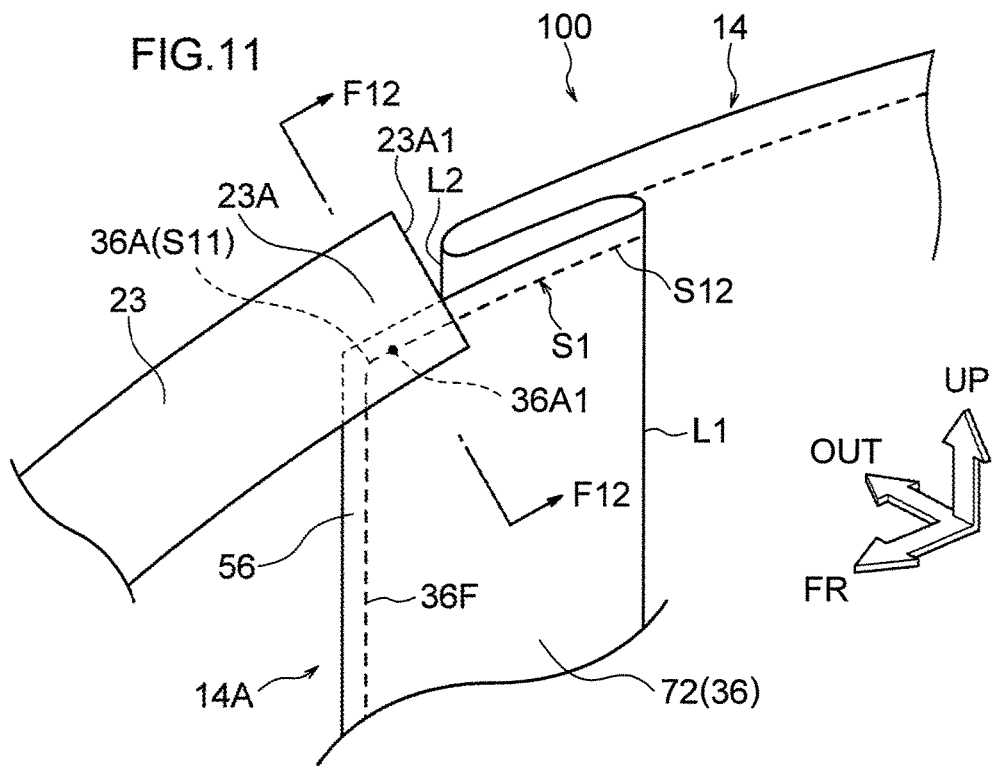
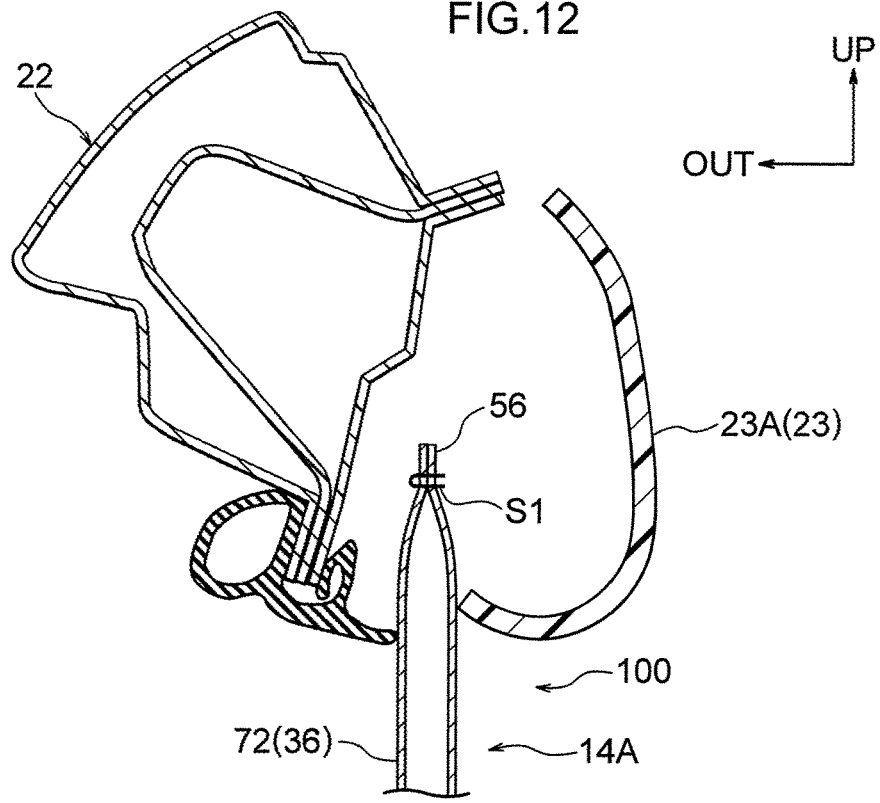

VEHICLE CURTAIN AIRBAG DEVICE

CROSS-REFERENCE TO RELATED APPLICATION

This application is based on and claims priority under 35 USC 119 from Japanese Patent Application No. 2015-079802 filed on Apr. 9, 2015, the disclosure of which is incorporated by reference herein.

BACKGROUND

Technical Field

The present specification relates to a vehicle curtain airbag device.

Related Art

A curtain airbag described in Japanese Patent Application Laid-Open (JP-A) No. 2004-256000 includes a main inflation section that inflates and deploys at the vehicle lower side of a roof side rail section, and an extended inflation section (front side sub chamber) that inflates and deploys toward the vehicle front side beyond the roof side rail section. The front side sub chamber is superimposed on the main inflation section side by being folded in two, and the curtain airbag is then rolled and stowed in the roof side rail section. This enables occupant protection to be secured without stowing the curtain airbag inside a front pillar garnish.

In the curtain airbag configured as described above, when the front side sub chamber that has been folded in two is unfolded, inflates and deploys, the front side sub chamber impedes on the front side glass, and the deployment behavior of the front side sub chamber becomes unstable, such that there is a possibility of a delay in the deployment of the front side sub chamber.

It is therefore conceivable that a Z-fold, which has superior deployment performance, is employed for the front side sub chamber. However, in curtain airbags that handle a roll-over or an oblique collision, the front side sub chamber has a large capacity, such that cases are conceivable in which a stowing space for the folded curtain airbag is expanded to a region covered by a rear end portion of a front pillar garnish. In cases of such a configuration, there is a possibility that the front side sub chamber catches on the rear end portion of the front pillar garnish, and that the deployment behavior of the front side sub chamber becomes unstable during inflation and deployment of the curtain airbag.

SUMMARY

A vehicle curtain airbag device of a first aspect of the present specification includes a curtain airbag having a front side sub chamber at a front side of a front side main chamber, the curtain airbag inflates and deploys along a vehicle cabin side section on being supplied with gas from an inflator. A front end side, at which the front side sub chamber is provided, is Z-folded toward a vehicle width direction inner side to form a Z-folded region, the curtain airbag is further folded bottom-to-top and stowed in an upper end portion of the vehicle cabin side section, and, in the stowed state, a front end portion at the Z-folded region is covered from the vehicle width direction inner side by a rear end portion of a front pillar garnish. A corner portion at a front end side and an upper end side of the front side sub chamber is formed in a circular arc shape that is convex toward a front side and an upper side of the front side sub chamber. In a mid-deployment state of the curtain airbag in which the bottom-to-top folding is unfolded and the Z-fold is not unfolded, a front end side and an upper end side of the Z-folded region are covered from the vehicle width direction inner side by the rear end portion of the front pillar garnish, the corner portion overlaps a vehicle width direction outer side of the rear end portion of the front pillar garnish, and a rear end of the corner portion is positioned further to a vehicle rear side than a rear end of the front pillar garnish.

In the first aspect of the present specification, the front end side of the curtain airbag at which the front side sub chamber is provided is Z-folded toward the vehicle width direction inner side, and the curtain airbag is further folded bottom-to-top and stowed in the upper end portion of the vehicle cabin side section. When the curtain airbag is inflated and deployed on being supplied with gas from the inflator, the bottom-to-top folding is unfolded and the curtain airbag inflates and deployed toward the vehicle lower side, then the Z-fold is unfolded and the front side sub chamber inflates and deploys toward the vehicle front side.

Note that in this aspect, in the stowed state of the curtain airbag, a front end portion of the Z-folded region, namely, a region including part of the front side sub chamber, is covered from the vehicle width direction inner side by the rear end portion of the front pillar garnish. It is thereby easy to secure a stowing space for the curtain airbag, even in cases in which the capacity of the front side sub chamber has increased. However, it is conceivable that the deployment behavior of the front side sub chamber might become unstable, due to the front side sub chamber catching on the rear end portion of the front pillar garnish.

In this aspect, the corner portion at the front end side and upper end side of the front side sub chamber is formed in a circular arc shape that is convex toward the front side and the upper side of the front side sub chamber. Moreover, in the mid-deployment state of the curtain airbag in which the bottom-to-top folding is unfolded and the Z-fold is not unfolded, the front end side and upper end side of the Z-folded region is covered from the vehicle width direction inner side by the rear end portion of the front pillar garnish, the corner portion overlaps the vehicle width direction outer side of the rear end portion of the front pillar garnish, and the rear end of the corner portion is positioned further to the vehicle rear side than the rear end of the front pillar garnish.

This enables the inflation thickness of an inflation portion at the front end side and upper end side of the front side sub chamber that overlaps the rear end portion of the front pillar garnish in the vehicle width direction to be reduced. The front end side and upper end side of the front side sub chamber thereby easily comes out toward the vehicle width direction inner side of the front pillar garnish, such that the above-described catching is less liable to occur. Moreover, the Z-fold has superior deployment performance compared to being folded in two. The present aspect thereby contributes to achieving a larger capacity and more stable deployment behavior of the front side sub chamber.

A vehicle curtain airbag device of a second aspect of the present specification includes a curtain airbag having a front side sub chamber at a front side of a front side main chamber, the curtain airbag inflates and deploys along a vehicle cabin side section on being supplied with gas from an inflator. A front end side, at which the front side sub chamber is provided, is Z-folded toward a vehicle width direction inner side to form three inflation portions that overlap each other in a vehicle width direction, the curtain airbag is further folded bottom-to-top and stowed in an upper end portion of the vehicle cabin side section, and, in the stowed state, a front end portion at the Z-folded region is covered from the vehicle width direction inner side by a rear end portion of a front pillar garnish. In a mid-deployment state of the curtain airbag in which the bottom-to-top folding is unfolded and the Z-fold is not unfolded, at a front end side and an upper end side of the Z-folded region, at least one of the three inflation portions is not positioned at a vehicle width direction outer side of the rear end portion of the front pillar garnish.

In the second aspect of the present specification, the front end side of the curtain airbag at which the front side sub chamber is provided is Z-folded toward the vehicle width direction inner side to form the three inflation portions that overlap each other in the vehicle width direction, and the curtain airbag is further folded bottom-to-top and stowed in the upper end portion of the vehicle cabin side section. When the curtain airbag inflates and deploys on being supplied with gas from the inflator, the bottom-to-top folding is unfolded and the curtain airbag inflates and deploys toward the vehicle lower side, then the Z-fold is unfolded and the front side sub chamber inflates and deploys toward the vehicle front side.

Note that in this aspect, in the stowed state of the curtain airbag, the front end portion of the Z-folded region, namely, a region including part of the front side sub chamber, is covered from the vehicle width direction inner side by the rear end portion of the front pillar garnish. It is thereby easy to secure a stowing space for the curtain airbag, even in cases in which the capacity of the front side sub chamber has increased. However, it is conceivable that the deployment behavior of the front side sub chamber might become unstable, due to the front side sub chamber catching on the rear end portion of the front pillar garnish.

In this aspect, in the mid-deployment state of the curtain airbag in which the bottom-to-top folding is unfolded and the Z-fold is not unfolded, at the front end side and the upper end side of the Z-folded region, at least one of the three inflation portions is not positioned at the vehicle width direction outer side of the rear end portion of the front pillar garnish.

Thus, in the mid-deployment state, the front side sub chamber is less liable to catch on the rear end portion of the front pillar garnish than a configuration in which all three inflation portions are positioned at the vehicle width direction outer side of the front pillar garnish. Moreover, the Z-fold has superior deployment performance compared to being folded in two. Thus the present aspect contributes to achieving a larger capacity and more stable deployment behavior of the front side sub chamber.

A vehicle curtain airbag device of a third aspect of the present specification is the second aspect, wherein the Z-fold is set such that, in the mid-deployment state, among fold lines of the Z-fold, a fold line positioned at a vehicle front side is positioned at a vehicle rear side of a rear end of the front pillar garnish.

In the third aspect of the present specification, the Z-fold is set as described above, such that in the mid-deployment state, two inflation portions among the three inflation portions are positioned further to the vehicle rear side than the rear end of the front pillar garnish. This enables the advantageous effects of the second aspect to be obtained by a simple change in which only the fold method of the Z-fold is changed.

A vehicle curtain airbag device of a fourth aspect of the present specification is the second aspect, wherein, in the mid-deployment state, among the three inflation portions, an inflation portion configuring a front end side of the front side sub chamber is not positioned at the vehicle width direction outer side of the rear end portion of the front pillar garnish.

The fourth aspect of the present specification is configured as described above, thereby enabling the inflation portion at the front end side of the front side sub chamber to be prevented from catching on the rear end portion of the front pillar garnish.

A vehicle curtain airbag device of a fifth aspect of the present specification is the fourth aspect, wherein a corner portion at a front end side and an upper end side of an outer peripheral non-inflating portion set at an outer periphery of the curtain airbag, is formed at a front side and an upper side of the front side sub chamber such that, in the mid-deployment state, the outer peripheral non-inflating portion is not positioned at the vehicle width direction outer side of the rear end portion of the front pillar garnish.

The fifth aspect of the present specification is configured as described above, thereby enabling the outer peripheral non-inflating portion at the front side and upper side of the front side sub chamber to be prevented from catching on the rear end portion of the front pillar garnish.

A vehicle curtain airbag device of a sixth aspect of the present specification is the second aspect, wherein the Z-fold is set such that, in the mid-deployment state, among fold lines of the Z-fold, a fold line positioned at a vehicle front side is positioned at a vehicle front side of a rear end of the front pillar garnish, and a front edge portion of the front side sub chamber is positioned at a vehicle rear side of the rear end of the front pillar garnish.

In the sixth aspect of the present specification, the Z-fold is set as described above, thereby enabling the front edge portion side (front end side) of the front side sub chamber to be prevented from catching on the rear end portion of the front pillar garnish.

As explained above, in the vehicle curtain airbag device according to the present specification, the configuration including the curtain airbag that is Z-folded at the front end side at which the front side sub chamber is provided, and further folded from bottom-to-top, contributes to both a larger capacity and more stable deployment behavior of the front side sub chamber.

BRIEF DESCRIPTION OF THE DRAWINGS

Exemplary embodiments of the present specification will be described in detail based on the following figures, wherein:

FIG. 4A is a side view illustrating a state in which a curtain airbag has been deployed in a planar face shape;

FIG. 4B is a side view illustrating a state in which a front end side of the curtain airbag illustrated in FIG. 4A has been Z-folded toward the vehicle width direction inner side;

FIG. 4C is a side view illustrating a state in which the curtain airbag illustrated in FIG. 4B has been folded bottom-to-top by rolling;

FIG. 5 is a perspective view of part of the configuration illustrated in FIG. 2, viewed diagonally from the vehicle upper front side;

FIG. 6 is an enlarged cross-section sectioned along line F6-F6 in FIG. 5;

FIG. 11 is a perspective view corresponding to FIG. 5, illustrating a partial configuration of a vehicle curtain airbag device according to a third exemplary embodiment;

FIG. 12 is an enlarged cross-section sectioned along line F12-F12 in FIG. 11;

DETAILED DESCRIPTION

First Exemplary Embodiment

Explanation follows regarding a vehicle curtain airbag device 10 according to a first exemplary embodiment of the present specification, based on FIG. 1 to FIG. 6. Note that in each of the drawings, the arrow FR, the arrow UP, and the arrow OUT respectively refer as appropriate to the front direction (direction of progress), the upper direction, and the width direction outer side of an automobile (vehicle) 12 installed with the vehicle curtain airbag device 10. In the below explanation, unless specifically stated otherwise, explanation simply referring to the front-rear, left-right, and up-down directions refers to front-rear in the vehicle front-rear direction, left-right in the vehicle left-right direction (vehicle width direction), and up-down in the vehicle up-down direction. In the below explanation, explanation first follows regarding an overall configuration of the vehicle curtain airbag device 10, and then regarding relevant portions of the present exemplary embodiment.

Overall Configuration of Curtain Airbag Device

Figure 1:
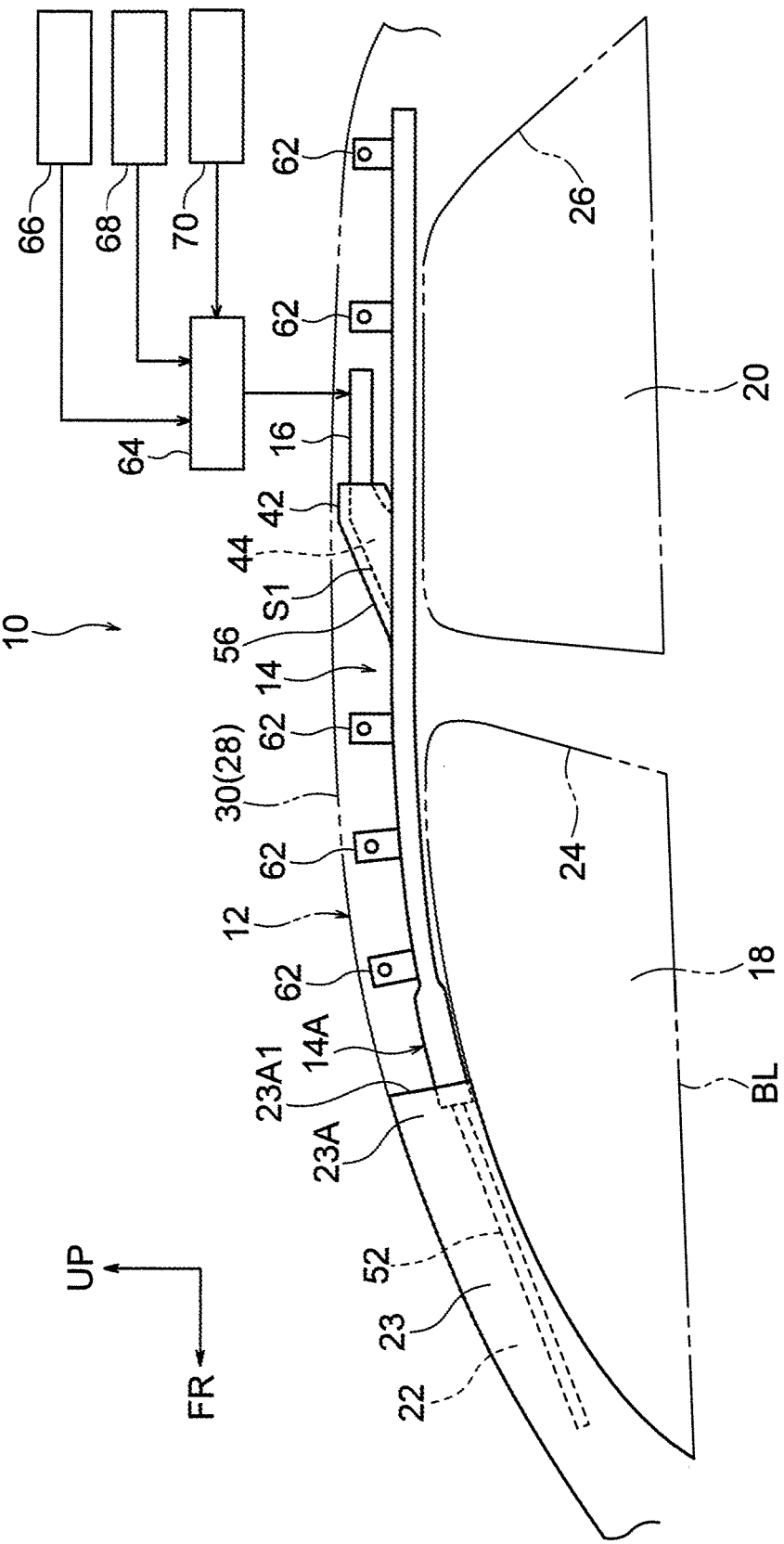
FIG. 1 is a side view of an overall schematic configuration viewed from the vehicle width direction inner side of a vehicle curtain airbag device according to a first exemplary embodiment, illustrating a stowed state of a curtain airbag.
Figure 2:
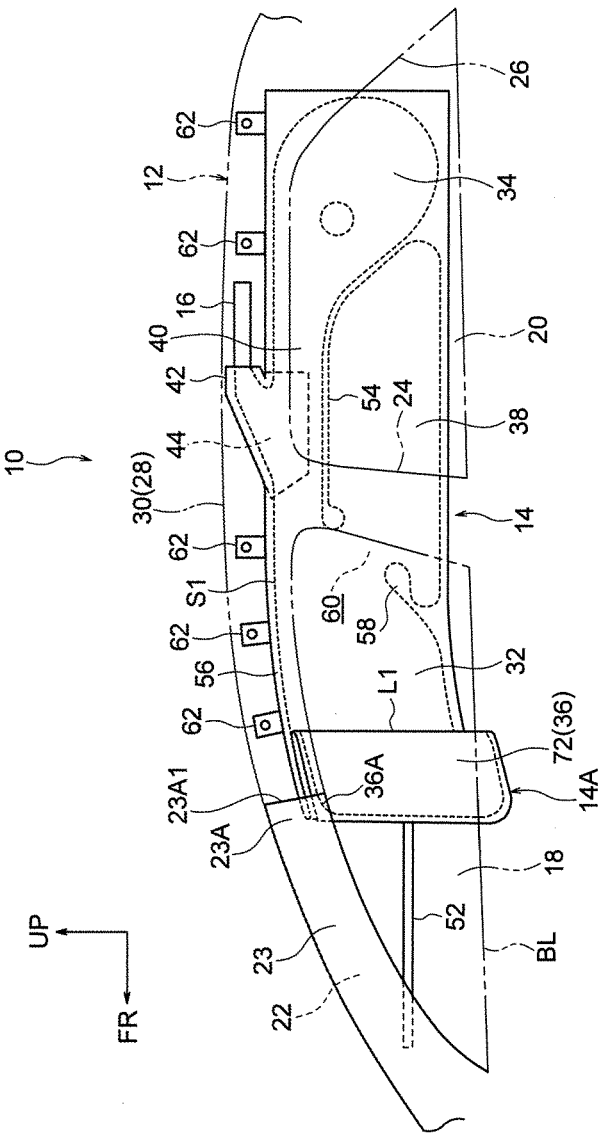
FIG. 2 is a side view corresponding to FIG. 1, illustrating a mid-deployment state of a curtain airbag.
Figure 3:
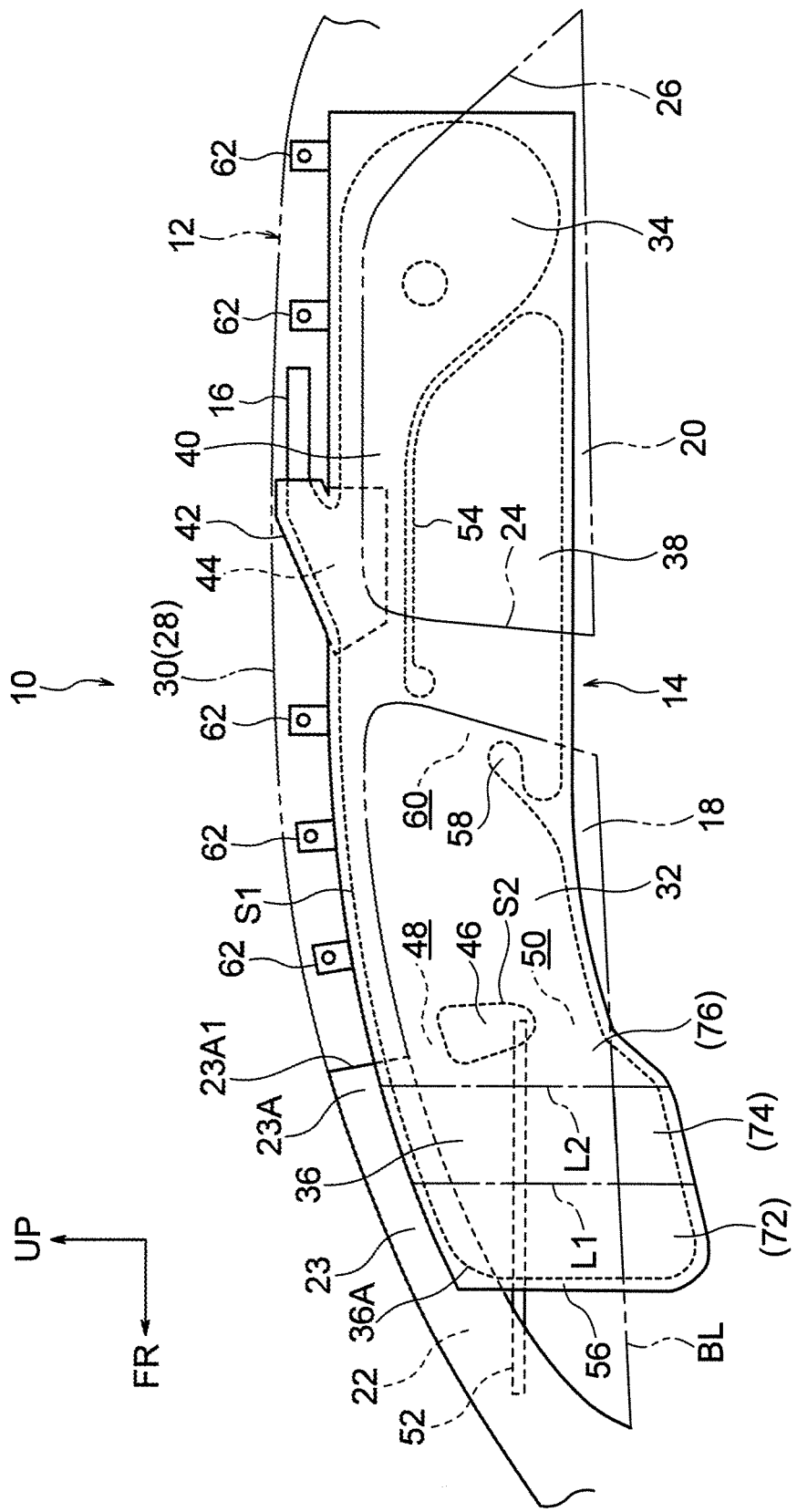
FIG. 3 is a side view corresponding to FIG. 1 and FIG. 2, illustrating a completely deployed state of a curtain airbag.

As illustrated in FIG. 1 to FIG. 3, the vehicle curtain airbag device 10 is installed in a sedan type automobile 12, for example, and includes a curtain airbag 14, and an inflator 16. As illustrated in FIG. 3, the curtain airbag 14 inflates and deploys along a vehicle cabin side section on being supplied with gas from the inflator 16, and is formed so as to cover side window glass 18, 20, and a B pillar (center pillar) 24.

As illustrated in FIG. 1, the curtain airbag 14 is normally folded in an elongated shape, and then stowed together with the inflator 16 in a roof side section 28 provided at an upper end portion of the vehicle cabin side section. In the stowed state, the elongated shape curtain airbag 14 is formed so as to extend along the roof side section 28, from a rear end portion of an A pillar (front pillar) 22 as far as an upper end side of a C pillar (rear pillar) 26.

The A pillar 22 is covered from the vehicle width direction inner side by an A pillar garnish 23 attached to the A pillar 22. The roof side section 28 includes a roof side rail 30 and a roof head lining, not illustrated in the drawings, and the curtain airbag 14 and the inflator 16 are stowed between the roof side rail 30 and the roof head lining.

The curtain airbag 14 is formed in a bag shape by superimposing two base cloths, formed by cutting a nylon or polyester cloth, for example, and stitching together outer peripheral edge portions of the base cloths along a stitch portion S1. Note that the manufacturing method of the curtain airbag 14 is not limited to that described above, and may be changed as appropriate. For example, the curtain airbag 14 may be manufactured by a one piece woven (OPW) method. In the OPW method, a bag body without stitches is formed by multiple ply weaving at necessary locations, while simultaneously weaving two sheets of cloth using a Jacquard loom.

The curtain airbag 14 includes a front side main chamber 32 and a rear side main chamber 34, a front side sub chamber 36 provided at the front side of the front side main chamber 32, and a rear side sub chamber 38 provided spanning between the front and rear main chambers 32, 34. The curtain airbag 14 also includes a gas supply path 40 that places the front and rear main chambers 32, 34 in communication with each other, and a connection path 42 connected to the inflator 16.

The front side main chamber 32 inflates and deploys at the vehicle width direction outer side of the head of a front seat occupant, and is interposed between the head of the front seat occupant and a vehicle body side section. The rear side main chamber 34 inflates and deploys at the vehicle width direction outer side of the head of a rear seat occupant, and is interposed between the head of the rear seat occupant and the vehicle body side section. The gas supply path 40 is provided toward the vehicle rear of a front-rear direction intermediate portion of an upper end portion of the curtain airbag 14, and extends along the front-rear direction of the curtain airbag 14. An upper portion of the front side main chamber 32 and an upper portion of the rear side main chamber 34 are placed in communication with each other by the gas supply path 40.

The tube shaped connection path 42 extends out toward the upper side and rear side from an upper end portion of the gas supply path 40. The cylinder type inflator 16 is connected to a rear end portion of the connection path 42. A diffuser 44 (a regulating cloth; also referred to as an inner tube) is provided inside the connection path 42 and the gas supply path 40. The diffuser 44 distributes gas ejected from the inflator 16 toward the vehicle front side and vehicle rear side inside the gas supply path 40.

The front side sub chamber 36 inflates and deploys in front of the front side main chamber 32, configures a front end portion of the curtain airbag 14, and is formed to protect the head of the front seat occupant at the front side of the front seat in an oblique collision or a roll-over. The front side sub chamber 36 is formed such that, in an inflated and deployed state (a completely deployed state), an upper edge side overlaps the A pillar 22, and a lower end side projects out further to the lower side than the front side main chamber 32, so as to straddle above and below a door belt line BL of a front side door.

The front side sub chamber 36 is partially partitioned from the front side main chamber 32 by an island shaped non-inflating portion 46, formed by a ring-shaped stitch portion S2 stitched in the base cloths of the curtain airbag 14. Restricted flow paths 48, 50 are respectively formed above and below the non-inflating portion 46, and the front side main chamber 32 and the front side sub chamber 36 are placed in communication with each other by the restricted flow paths 48, 50. A tension belt 52 (not illustrated in FIG. 4A to FIG. 4C) spans across between the non-inflating portion 46 and the A pillar 22.

The rear side sub chamber 38 inflates and deploys between the front and rear main chambers 32, 34, and is formed to protect the head of the rear seat occupant at the front side of the rear seat in a roll-over or an oblique collision. The rear side sub chamber 38 is positioned below the gas supply path 40, and is partitioned from the gas supply path 40 and the rear side main chamber 34 by a non-inflating portion 54 formed by part of the stitch portion S1. A rear end portion of the non-inflating portion 54 is integrally connected to a lower portion of an outer peripheral non-inflating portion 56, set at an outer peripheral portion of the curtain airbag 14.

The rear side sub chamber 38 is partially partitioned from the front side main chamber 32 by a non-inflating portion 58 extending from the lower portion of the outer peripheral non-inflating portion 56 toward the upper side. The non-inflating portion 58 is formed by part of the stitch portion S1. A restricted flow path 60, this being a gas supply inlet to the rear side sub chamber 38, is formed between an upper end portion of the non-inflating portion 58 and a front end portion of the non-inflating portion 54.

When the curtain airbag 14 described above is folded, a front end side of the curtain airbag 14 where the front side sub chamber 36 is provided is Z-folded (see FIG. 4B) toward the vehicle width direction inner side along fold lines L1, L2 illustrated in FIG. 3 and FIG. 4A to form a Z-folded region. Next, as illustrated in FIG. 4C, the curtain airbag 14 is folded bottom-to-top by a fold method including at least one of rolling or pleating (rolling in this case).

Plural tabs 62 aligned in the vehicle front-rear direction are attached to an upper portion of the outer peripheral non-inflating portion 56, this being an upper end edge of the curtain airbag 14. The curtain airbag 14 is fixed to the roof side rail 30 and the C pillar 26 using clips pierced through the tabs 62 and fixings such as bolts and nuts. The inflator 16 is fixed to the roof side rail 30 by brackets, not illustrated in the drawings.

The curtain airbag 14 and the inflator 16 described above are each provided at either vehicle width direction side of the automobile 12. Namely, the vehicle curtain airbag device 10 is formed including a pair of left and right curtain airbags 14, and a pair of left and right inflators 16. Note that illustration of the curtain airbag 14 and the inflator 16 at the vehicle left side is omitted.

As illustrated in FIG. 1, the vehicle curtain airbag device 10 also includes an airbag electronic control unit (ECU) 64 that is electrically connected to the inflator 16, and a side collision sensor 66, a roll-over sensor 68, and an oblique collision sensor 70 that are each electrically connected to the airbag ECU 64. The side collision sensor 66 predicts or detects (the inevitability of) a side collision of the automobile 12, and output a side collision detection signal to the airbag ECU 64. The roll-over sensor 68 predicts or detects (the inevitability of) a roll-over of the automobile 12, and output a roll-over detection signal to the airbag ECU 64. The oblique collision sensor 70 predicts or detects (the inevita-bility of) an oblique collision of the automobile 12, and output an oblique collision detection signal to the airbag ECU 64.

The airbag ECU 64 is configured to actuate the inflator 16 at the side collision side or the oblique collision side (the nearer side in either case) when a side collision detection signal or an oblique collision detection signal is input. The curtain airbag 14 at the nearer side thereby receives a supply of gas, inflates, and deploys when a side-on collision or an oblique collision occurs in the automobile 12. The airbag ECU 64 is configured to actuate the inflators 16 at either vehicle width direction side when a roll-over detection signal is input. Note that, when a roll-over detection signal is input after a side-on collision or an oblique collision, the airbag ECU 64 is configured to actuate the inflator 16 at the opposite side (far side) to the nearer side that has already been actuated.

When the inflator 16 is actuated, gas from the inflator 16 is distributed to a front end side and a rear end side of the gas supply path 40 by the diffuser 44. Gas distributed by the diffuser 44 is supplied to the front and rear main chambers 32, 34, and the front and rear main chambers 32, 34 inflate. The curtain airbag 14 thereby presses a terminal portion of the roof head lining downward toward the lower side, and deploys toward the lower side along a vehicle cabin side face.

Some of the gas supplied to the front side main chamber 32 passes through the restricted flow paths 48, 50 and is supplied to the front side sub chamber 36, and the front side sub chamber 36 inflates with a time delay with respect to the front and rear main chambers 32, 34. Moreover, some of the gas supplied to the front side main chamber 32 passes through the restricted flow path 60 and is supplied to the rear side sub chamber 38, and the rear side sub chamber 38 inflates with a time delay with respect to the front and rear main chambers 32, 34. Explanation follows regarding relevant portions of the present exemplary embodiment.

Relevant Portions of Present Exemplary Embodiment

As previously described, in the present exemplary embodiment, when the curtain airbag 14 is folded, the front end side of the curtain airbag 14 where the front side sub chamber 36 is provided is Z-folded (see FIG. 4B) toward the vehicle width direction inner side along the fold lines L1, L2 illustrated in FIG. 3 and FIG. 4A. Three inflation portions 72, 74, 76 (see FIG. 4A and FIG. 6) thereby overlap each other in the vehicle width direction at a Z-folded region 14A.

Note that in the present exemplary embodiment, the inflation portion 72 configures a front end side of the front side sub chamber 36, the inflation portion 74 configures a front-rear direction intermediate portion and part of a rear end side of the front side sub chamber 36, and the inflation portion 76 configures a rear end portion of the front side sub chamber 36, the restricted flow paths 48, 50, and a front end portion of the front side main chamber 32. The inflation portions 72, 74, 76 are sectioned by the fold lines L1, L2 of the Z-fold in a state in which the front end side of curtain airbag 14 is Z-folded, but form a continuous, integral unit in a state in which the Z-fold at the front end side of the curtain airbag 14 is unfolded.

In the present exemplary embodiment, configuration is such that, in the stowed state of the curtain airbag 14 illustrated in FIG. 1, a front end portion of the Z-folded region 14A is covered from the vehicle width direction inner side by a rear end portion 23A of the A pillar garnish 23.

As illustrated in FIG. 5, in the present exemplary embodiment, a corner portion 36A at a front end side and upper end side of the front side sub chamber 36 is formed in a circular arc shape that is convex toward the front side and upper side of the front side sub chamber 36. In the present exemplary embodiment, the corner portion 36A is formed by part of the stitch portion S1, and configures part of a boundary between the outer peripheral non-inflating portion 56, and the front side sub chamber 36 that is an inflation portion, of the curtain airbag 14. Note that a front edge portion of the front side sub chamber 36 has the reference numeral 36F in FIG. 5.

In the present exemplary embodiment, in a mid-deployment state in which the bottom-to-top folding of the curtain airbag 14 has been unfolded and the Z-fold has not been unfolded (the state illustrated in FIG. 2, FIG. 5, and FIG. 6, hereafter sometimes simply referred to as "mid-deployment state"), a front end side and upper end side of the Z-folded region 14A is covered from the vehicle width direction inner side by the rear end portion 23A of the A pillar garnish 23. In this state, configuration is such that the above-described corner portion 36A overlaps the vehicle width direction outer side of the rear end portion 23A of the A pillar garnish 23, and a rear end 36A1 of the corner portion 36A is positioned further to the vehicle rear side than a rear end 23A1 of the A pillar garnish 23.

As illustrated in FIG. 5 and FIG. 6, in the mid-deployment state, among the three inflation portions 72, 74, 76 aligned in the vehicle width direction at the vehicle width direction outer side of the rear end portion 23A of the A pillar garnish 23, the inflation portion 72 configuring the front end side of the front side sub chamber 36 is formed so as to have a smaller inflation thickness in the vehicle width direction than the other two inflation portions 74, 76. Note that, as illustrated in FIG. 5, the "rear end 36A1" is a boundary point of the stitch portion S1 between a circular arc shaped region S11 configuring the corner portion 36A, and a straight line shaped region S12 extending from the circular arc shaped region S11 toward a rear end side of the curtain airbag 14.

In the present exemplary embodiment, configuration is such that, even when gas is not supplied inside the curtain airbag 14, in the mid-deployment state, the corner portion 36A overlaps the vehicle width direction outer side of the rear end portion 23A of the A pillar garnish 23, and the rear end 36A1 of the corner portion 36A is positioned further to the vehicle rear side than the rear end 23A1 of the A pillar garnish 23; however, configuration is not limited thereto. Namely, it is sufficient that the above configuration is established in a state midway through the curtain airbag 14 being inflated and deployed by actuating the inflator 16.

Operation and Advantageous Effects

Explanation follows regarding operation and advantageous effects of the present exemplary embodiment.

In the vehicle curtain airbag device 10 with the above configuration, a front end side of the curtain airbag 14 where the front side sub chamber 36 is provided is Z-folded toward the vehicle width direction inner side, folded further bottom-to-top and stowed in the upper end portion of the vehicle cabin side section. When the curtain airbag 14 inflates and deploys on being supplied with gas from the inflator 16, the bottom-to-top folding is unfolded, the curtain airbag 14 inflates and deploys toward the vehicle lower side, then the Z-folding is unfolded and the front side sub chamber 36 inflates and deploys toward the vehicle front side.

Note that in the present exemplary embodiment, in the stowed state of the curtain airbag 14, the front end portion of the Z-folded region 14A, namely, a region including part of the front side sub chamber 36, is covered from the vehicle width direction inner side by the rear end portion 23A of the A pillar garnish 23. This enables a stowing space for the curtain airbag 14 to be easily secured, even in cases in which the front side sub chamber 36 has a large capacity. Moreover, the front side sub chamber 36 can be stowed further to the vehicle front side (the side at which the front side sub chamber 36 inflates and deploys), thereby contributing to earlier inflation and deployment of the front side sub chamber 36. However, it is conceivable that the deployment behavior of the front side sub chamber 36 might become unstable, due to the front side sub chamber 36 catching on the rear end portion 23A of the A pillar garnish 23.

Figure 7:
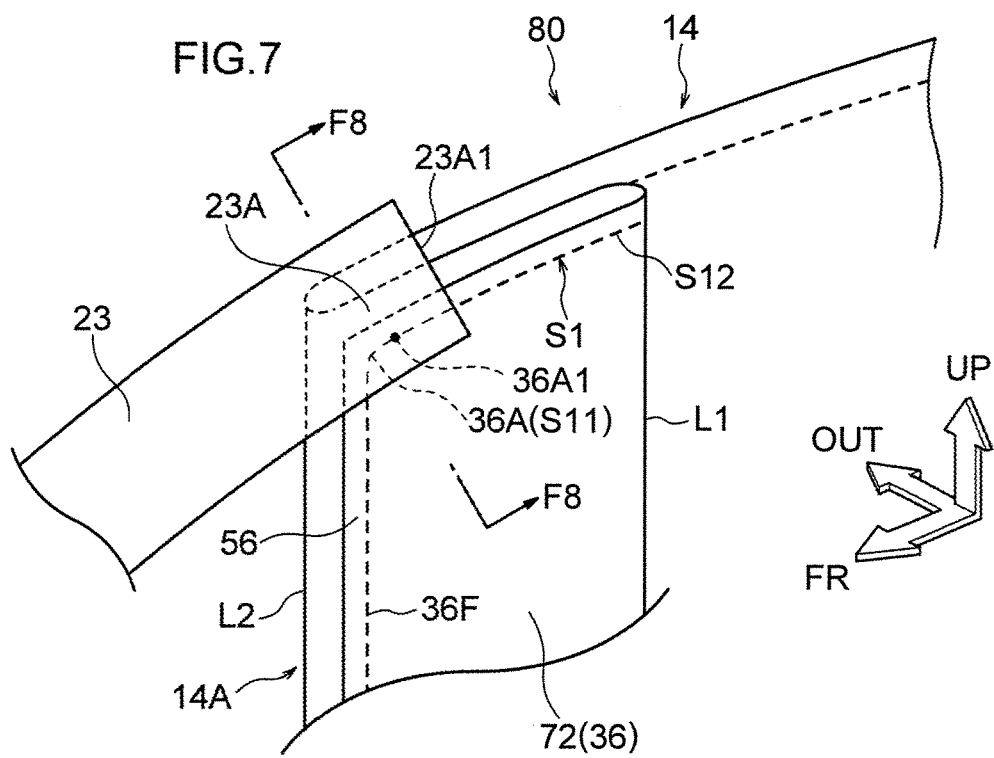
FIG. 7 is a perspective view corresponding to FIG. 5, illustrating a partial configuration of a vehicle curtain airbag device according to a Comparative Example.
Figure 8:
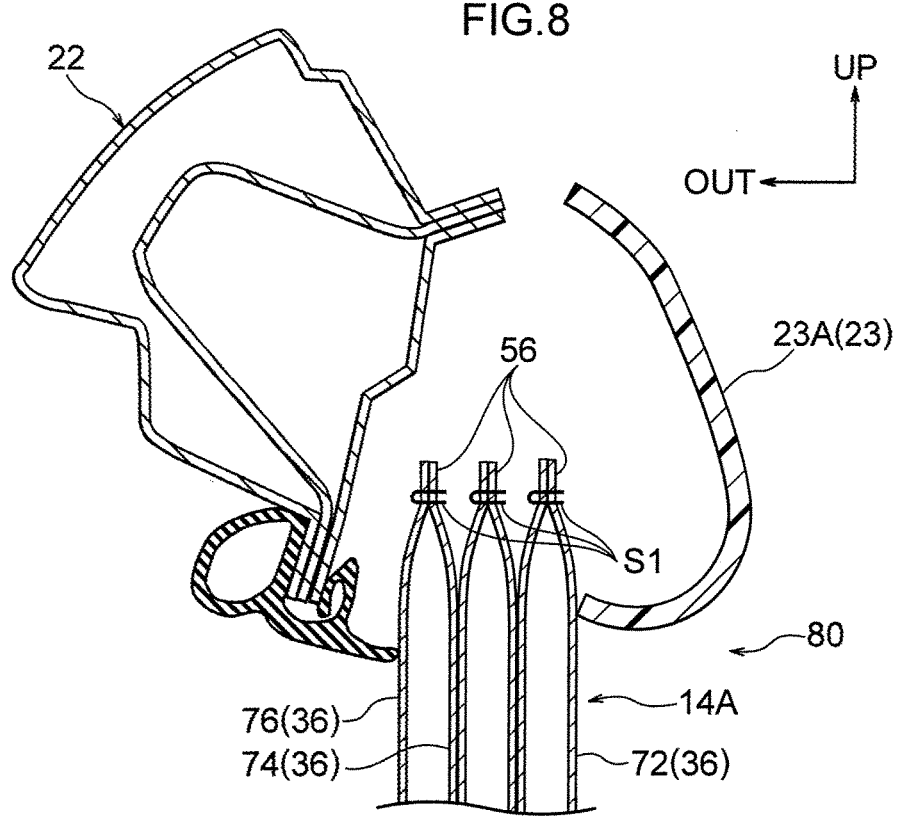
FIG. 8 is an enlarged cross-section sectioned along line F8-F8 in FIG. 7.

Explanation follows regarding this catching, with reference to a vehicle curtain airbag device 80 (hereafter referred to as Comparative Example 80) illustrated in FIG. 7 and FIG. 8. The Comparative Example 80 has basically the same configuration as the present exemplary embodiment; however, the configuration of the corner portion 36A at the front end side and upper end side of the front side sub chamber 36 is different to that in the present exemplary embodiment. In the mid-deployment state illustrated in FIG. 7 and FIG. 8, the corner portion 36A is formed such that the rear end 36A1 is positioned further to the vehicle front side than the rear end 23A1 of the A pillar garnish 23.

As illustrated in FIG. 8, in cases of such a configuration, among the three inflation portions 72, 74, 76 aligned in the vehicle width direction, the inflation portion 72 positioned furthest to the vehicle width direction inner side is pressed against the rear end portion 23A of the A pillar garnish 23 by inflation of the other two inflation portions 74, 76, such that the inflation portion 72 is liable to catch on the rear end portion 23A of the A pillar garnish 23.

In contrast thereto, in the present exemplary embodiment, configuration is such that, in the mid-deployment state, the rear end 36A1 of the corner portion 36A at the front end side and upper end side of the front side sub chamber 36 is positioned further to the vehicle rear side than the rear end 23A1 of the A pillar garnish 23. This enables the inflation thickness of the inflation portion 72, which overlaps the rear end portion 23A of the A pillar garnish 23 in the vehicle width direction at the front end side and upper end side of the front side sub chamber 36, to be made smaller.

The front end side and upper end side of the front side sub chamber 36 accordingly comes out toward the vehicle width direction inner side of the A pillar garnish 23 more easily, such that the above-described catching is less liable to occur. Moreover, a Z-fold has superior deployment performance compared to being folded in two. Thus the present exemplary embodiment contributes to achieving both a larger capacity and more stable deployment behavior of the front side sub chamber 36.

Explanation follows regarding other exemplary embodiments of the present specification. Note that configuration and operation that are basically the same as those in the first exemplary embodiment are appended with the same reference numerals as in the first exemplary embodiment, and explanation thereof is omitted.

Second Exemplary Embodiment

Figure 9:
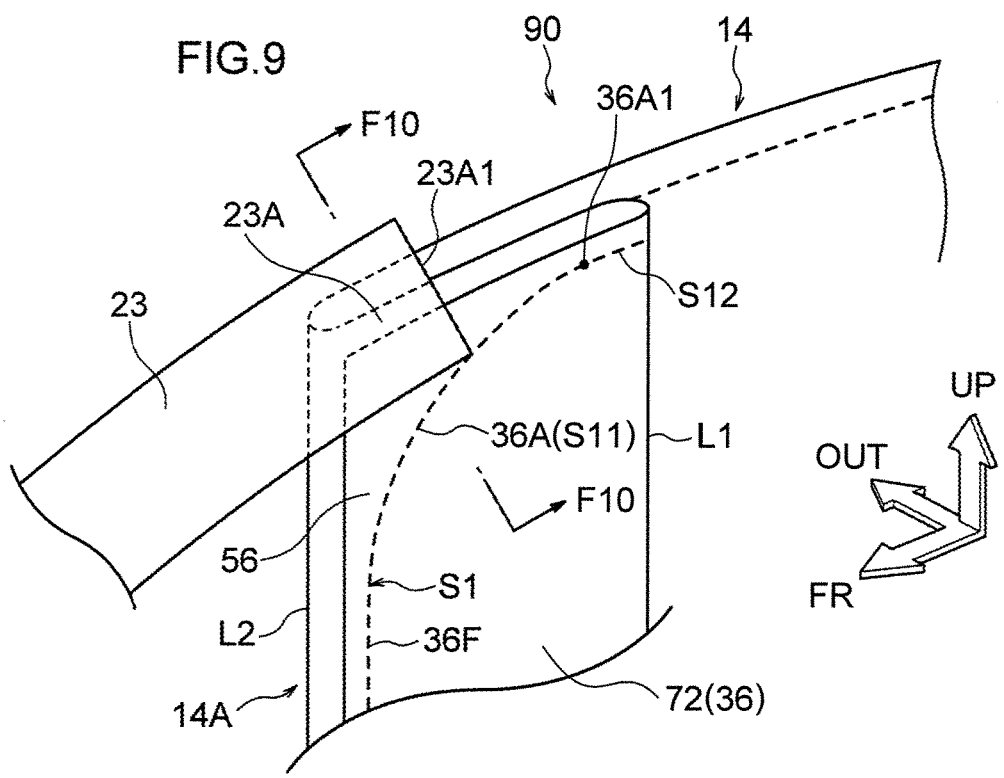
FIG. 9 is a perspective view corresponding to FIG. 5, illustrating a partial configuration of a vehicle curtain airbag device according to a second exemplary embodiment.
Figure 10:
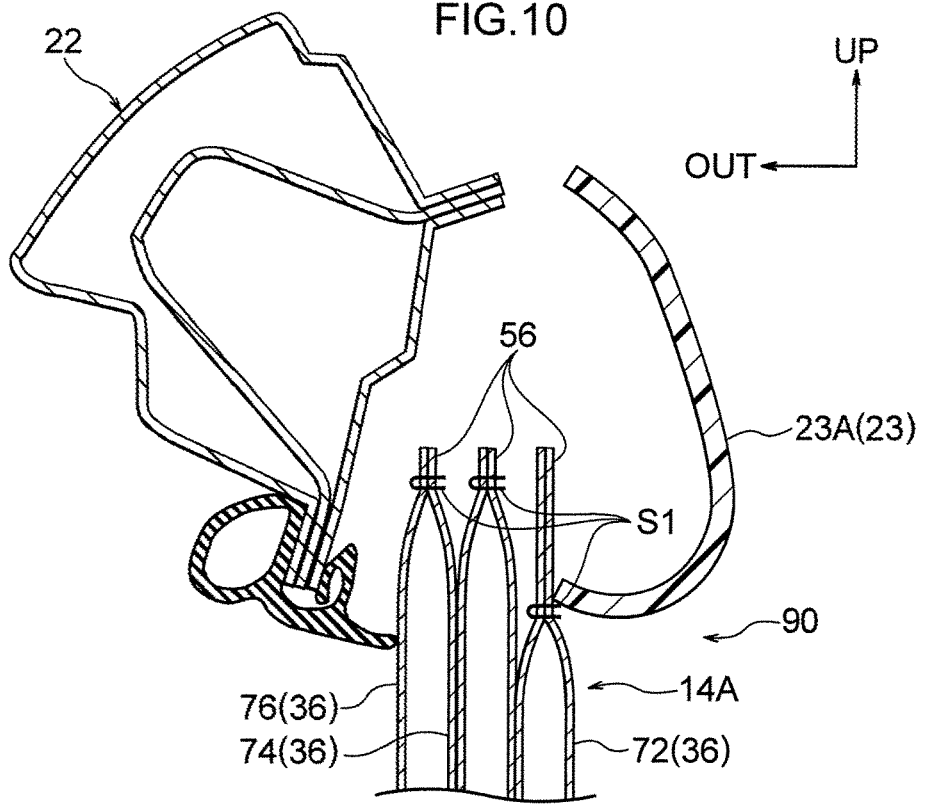
FIG. 10 is an enlarged cross-section sectioned along line F10-F10 in FIG. 9.

FIG. 9 is a perspective view corresponding to FIG. 5, illustrating a partial configuration of a vehicle curtain airbag device 90 according to a second exemplary embodiment of the present specification. FIG. 10 is an enlarged cross-section sectioned along line F10-F10 in FIG. 9. The present exemplary embodiment has basically the same configuration as in the first exemplary embodiment, but differs in that configuration of the corner portion 36A of the front side sub chamber 36 is different to that in the first exemplary embodiment.

Specifically, as illustrated in FIG. 9, the corner portion 36A is set further withdrawn to the rear side and lower side of the front side sub chamber 36 than in the first exemplary embodiment. Configuration is thereby such that, in the mid-deployment state illustrated in FIG. 9 and FIG. 10, among the three inflation portions 72, 74, 76 overlapping each other in the vehicle width direction at the Z-folded region 14A, the inflation portion 72 configuring the front end side of the front side sub chamber 36 is not positioned at the vehicle width direction outer side of the rear end portion 23A of the A pillar garnish 23. Namely, as illustrated in FIG. 10, configuration is such that the two inflation portions 74, 76 and the outer peripheral non-inflating portion 56 are positioned at the vehicle width direction outer side of the rear end portion 23A of the A pillar garnish 23.

In the present exemplary embodiment, in the mid-deployment state, the inflation portion 72 at the front end side of the front side sub chamber 36 can be prevented from catching on the rear end portion 23A of the A pillar garnish 23. This enables the deployment behavior of the front side sub chamber 36 to be more stable than in a configuration in which all three inflation portions 72, 74, 76 are positioned at the vehicle width direction outer side of the rear end portion 23A of the A pillar garnish 23 (see FIG. 7 and FIG. 8), thereby enabling basically the same operation and advantageous effects to be obtained as in the first exemplary embodiment.

Third Exemplary Embodiment

FIG. 11 is a perspective view corresponding to FIG. 5, illustrating a partial configuration of a vehicle curtain airbag device 100 according to a third exemplary embodiment of the present specification. FIG. 12 is an enlarged cross-section sectioned along line F12-F12 in FIG. 11. The present exemplary embodiment has basically the same configuration as in the first exemplary embodiment, but differs in that the fold method of the Z-fold is different to in the first exemplary embodiment.

In the present exemplary embodiment, in the mid-deployment state illustrated in FIG. 11 and FIG. 12, the Z-fold is offset, such that, among the fold lines L1, L2 of the Z-fold, the fold line L2 positioned at the vehicle front side is positioned at the vehicle rear side of the rear end 23A1 of the A pillar garnish 23. Configuration is thereby such that, in the mid-deployment state, among the three inflation portions 72, 74, 76, the two inflation portions 74, 76 are not positioned at the vehicle width direction outer side of the rear end portion 23A of the A pillar garnish 23.

In this exemplary embodiment also, the inflation portion 72 at the front end side of the front side sub chamber 36 comes out toward the vehicle width direction inner side of the A pillar garnish 23 more easily. This enables basically the same operation and advantageous effects as those in the first exemplary embodiment to be obtained by a simple change in which only the fold method of the Z-fold is changed.

Moreover, in the present exemplary embodiment, in the stowed state of the curtain airbag 14, the front end portion of the Z-folded region 14A is less bulky, such that the front end portion of the Z-folded region 14A is more easily stowed in a narrow gap between the A pillar garnish 23 and the A pillar 22. This also enables an increase in the width of the A pillar garnish 23 in order to stow the front end portion of the Z-folded region 14A to be avoided, thereby enabling obstruction of the view of the occupant due to increasing the width of the A pillar garnish 23 to be avoided.

Fourth Exemplary Embodiment

Figure 13:
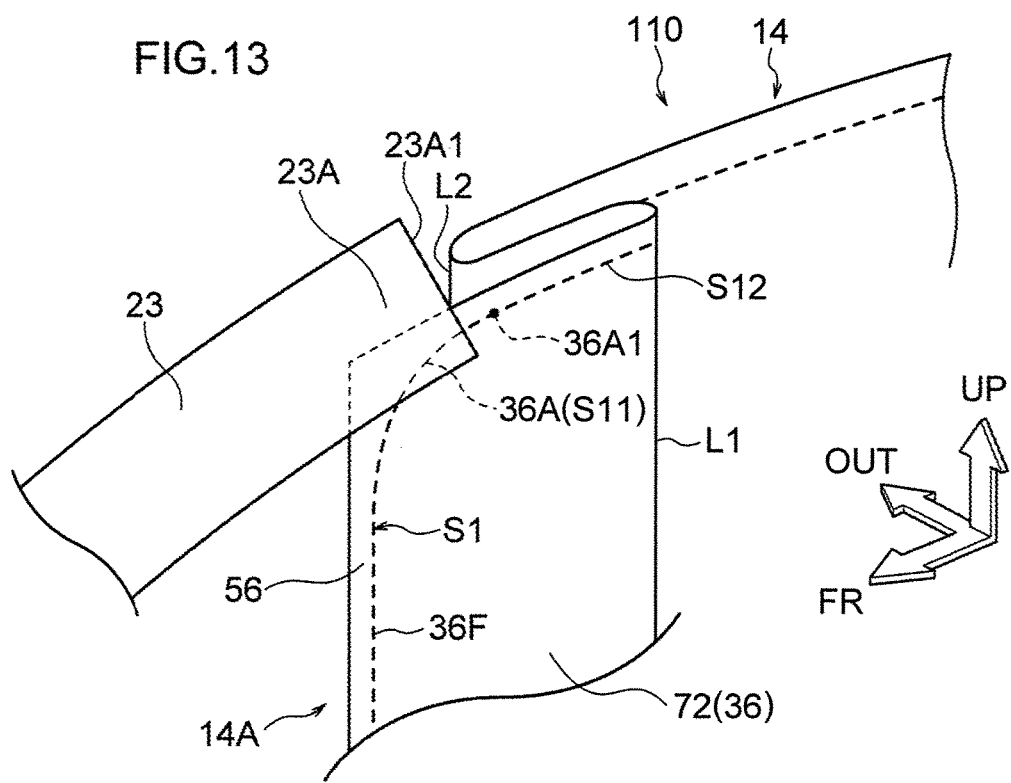
FIG. 13 is a perspective view corresponding to FIG. 5, illustrating a partial configuration of a vehicle curtain airbag device according to a fourth exemplary embodiment.

FIG. 13 is a perspective view corresponding to FIG. 5, illustrating a partial configuration of a vehicle curtain airbag device 110 according to a fourth exemplary embodiment of the present specification. In the present exemplary embodiment, the corner portion 36A of the front side sub chamber 36 is formed similarly to in the first exemplary embodiment, and the fold method of the Z-fold is set similarly to in the third exemplary embodiment. This exemplary embodiment enables similar operation and advantageous effects to be obtained as those in the third exemplary embodiment. Moreover, since the corner portion 36A is formed similarly to in the first exemplary embodiment, the front end side and upper end side of the front side sub chamber 36 easily comes out toward the vehicle width direction inner side of the A pillar garnish 23.

Fifth Exemplary Embodiment

Figure 14:
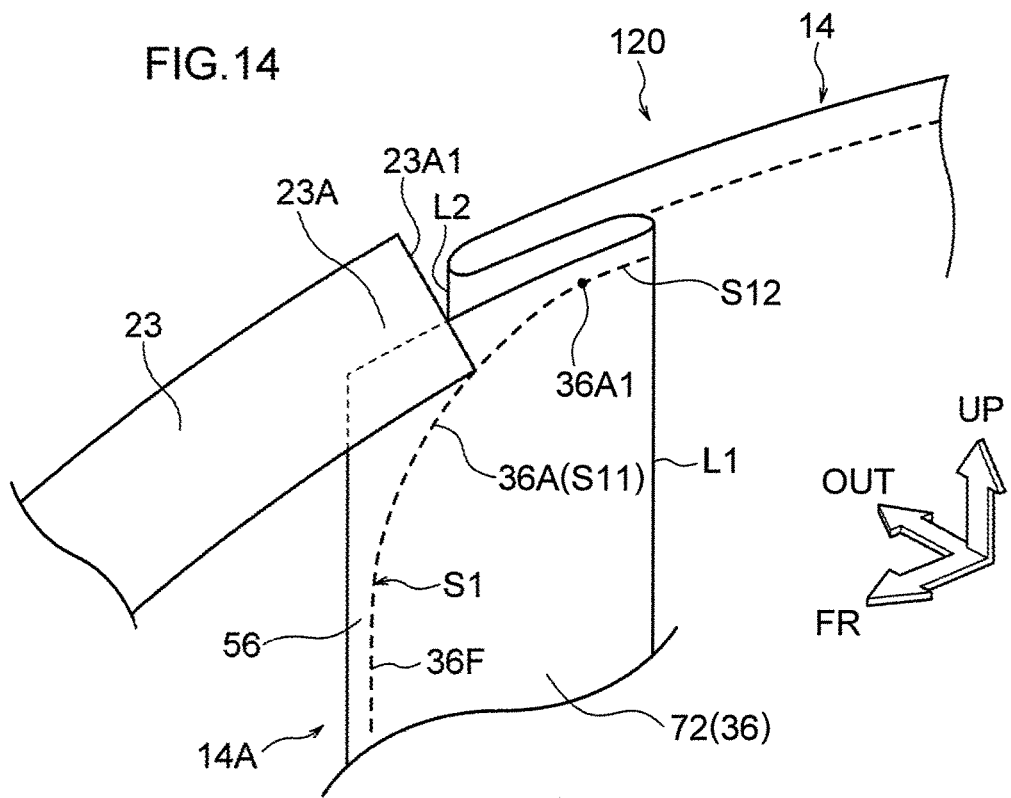
FIG. 14 is a perspective view corresponding to FIG. 5, illustrating a partial configuration of a vehicle curtain airbag device according to a fifth exemplary embodiment.

FIG. 14 is a perspective view corresponding to FIG. 5, illustrating a partial configuration of a vehicle curtain airbag device 120 according to a fifth exemplary embodiment of the present specification. In the present exemplary embodiment, the corner portion 36A of the front side sub chamber 36 is formed similarly to in the second exemplary embodiment, and the fold method of the Z-fold is set similarly to in the third exemplary embodiment. This exemplary embodiment also enables similar operation and advantageous effects to be obtained as those in the third exemplary embodiment. Moreover, since the corner portion 36A is formed similarly to that in the second exemplary embodiment, the front end side and upper end side of the front side sub chamber 36 can be prevented from catching on the rear end portion 23A of the A pillar garnish 23.

Sixth Exemplary Embodiment

Figure 15:
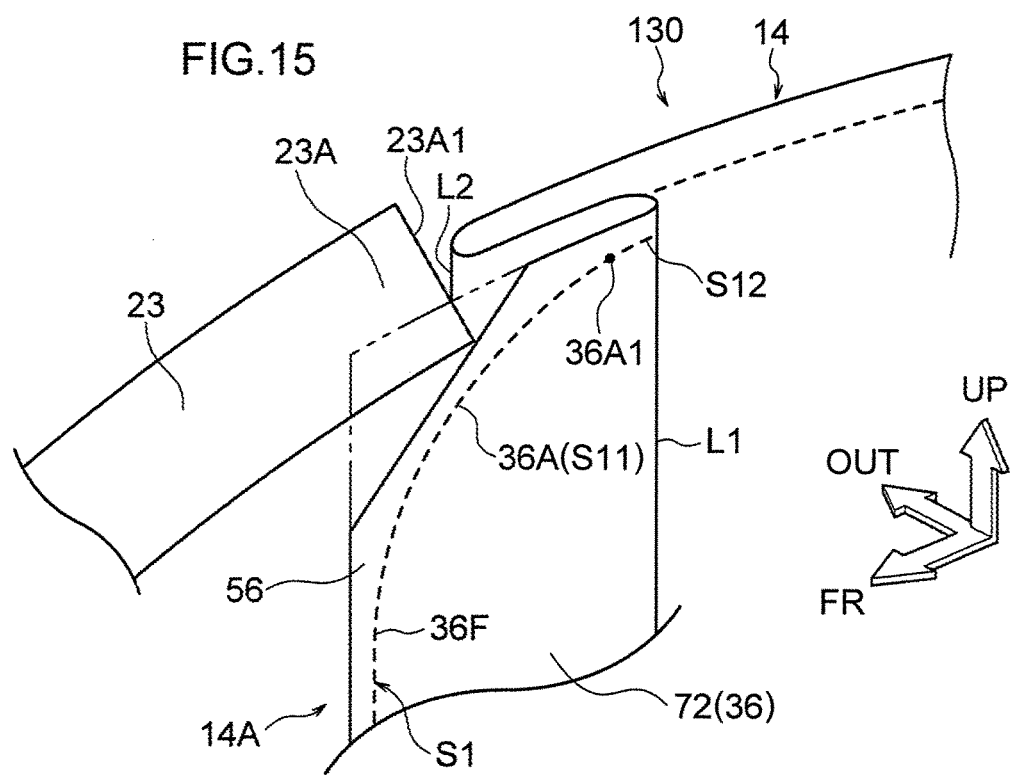
FIG. 15 is a perspective view corresponding to FIG. 5, illustrating a partial configuration of a vehicle curtain airbag device according to a sixth exemplary embodiment.

FIG. 15 is a perspective view corresponding to FIG. 5, illustrating a partial configuration of a vehicle curtain airbag device 130 according to a sixth exemplary embodiment of the present specification. In the present exemplary embodiment, the corner portion 36A of the front side sub chamber 36 is formed similarly to in the second exemplary embodiment, and the fold method of the Z-fold is set similarly to in the third exemplary embodiment. Furthermore, a corner portion at a front end side and upper end side of the outer peripheral non-inflating portion 56 is formed (cut) such that the outer peripheral non-inflating portion 56 at the front side and upper side of the front side sub chamber 36 is not positioned at the vehicle width direction outer side of the rear end portion 23A of the A pillar garnish 23 in the mid-deployment state. In the present exemplary embodiment, the outer peripheral non-inflating portion 56 at the front side and upper side of the front side sub chamber 36 can be prevented from catching on the rear end portion 23A of the A pillar garnish 23.

Seventh Exemplary Embodiment

Figure 16:
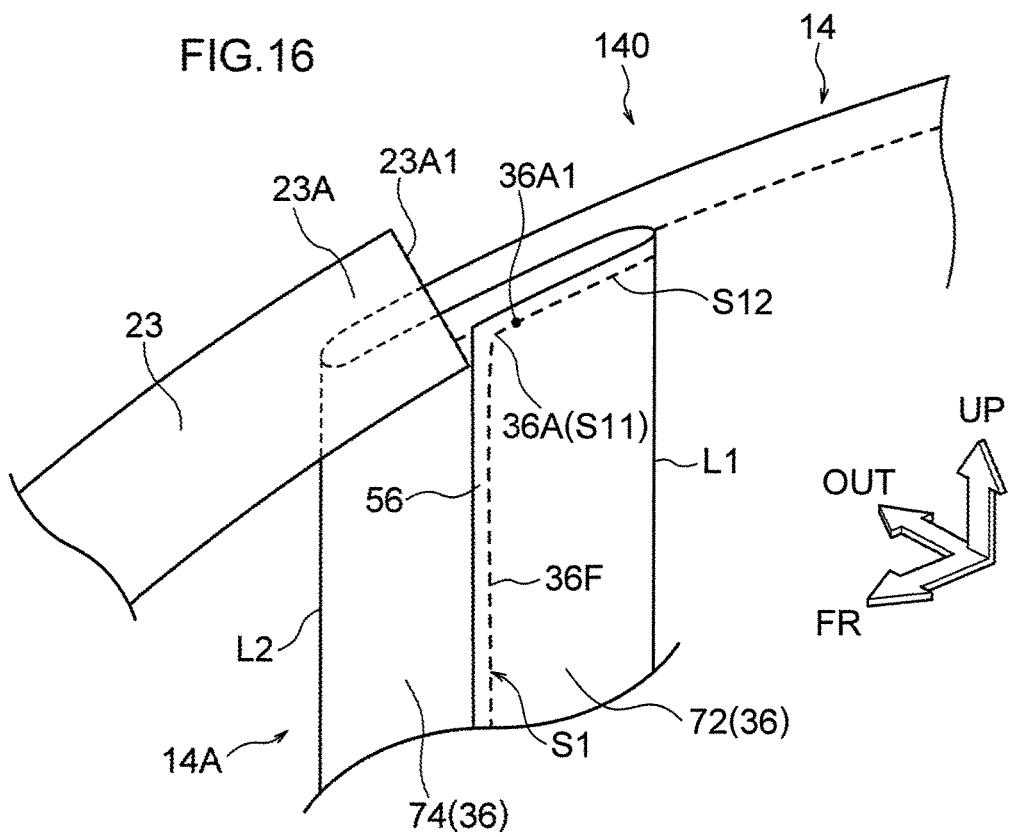
FIG. 16 is a perspective view corresponding to FIG. 5, illustrating a partial configuration of a vehicle curtain airbag device according to a seventh exemplary embodiment.

FIG. 16 is a perspective view corresponding to FIG. 5, illustrating a partial configuration of a vehicle curtain airbag device 140 according to a seventh exemplary embodiment of the present specification. In this exemplary embodiment, the Z-fold is set such that, among the fold lines L1, L2 of the Z-fold, the fold line L2 positioned at the vehicle front side is positioned at the vehicle front side of the rear end 23A1 of the A pillar garnish 23, and the front edge portion 36F of the front side sub chamber 36 is positioned at the vehicle rear side of the rear end 23A1 of the A pillar garnish 23, in the mid-deployment state. Configuration is thereby such that, in the mid-deployment state, among the three inflation portions 72, 74, 76, the inflation portion 72 at the front end side of the front side sub chamber 36 is not positioned at the vehicle width direction outer side of the rear end portion 23A of the A pillar garnish 23.

In the exemplary embodiment also, the front edge portion 36F side (front end side) of the front side sub chamber 36 can be prevented from catching on the rear end portion 23A of the A pillar garnish 23, thereby enabling basically the same operation and advantageous effects as those in the first exemplary embodiment to be obtained.

The present specification has been explained above with reference to several exemplary embodiments; however, various modifications may be implemented within a range not departing from the spirit of the present specification. Obviously, the scope of rights encompassed by the present specification is not limited by the above exemplary embodiments.

What is claimed is:

1. A vehicle curtain airbag device comprising:
a curtain airbag including a front side sub chamber at a front side of a front side main chamber, the curtain airbag inflates and deploys along a vehicle cabin side section on being supplied with gas from an inflator, wherein a front end side, at which the front side sub chamber is provided, is Z-folded toward a vehicle width direction inner side to form a Z-folded region, the curtain airbag is further folded bottom-to-top and stowed in an upper end portion of the vehicle cabin side section, and, in the stowed state, a front end portion at the Z-folded region is covered from the vehicle width direction inner side by a rear end portion of a front pillar garnish;

wherein a corner portion at a front end side and an upper end side of the front side sub chamber is formed in a circular arc shape that is convex toward a front side and an upper side of the front side sub chamber; and wherein in a mid-deployment state of the curtain airbag in which the bottom-to-top folding is unfolded and the Z-fold is not unfolded, a front end side and an upper end side of the Z-folded region are covered from the vehicle width direction inner side by the rear end portion of the front pillar garnish, the corner portion overlaps a vehicle width direction outer side of the rear end portion of the front pillar garnish, and a rear end of the corner portion is positioned further to a vehicle rear side than a rear end of the front pillar garnish.

2. The vehicle curtain airbag device of claim 1, wherein the front side sub chamber is formed such that, in an inflated and deployed state, an upper edge side of the front side sub chamber overlaps a front pillar, and a lower end side of the front side sub chamber projects out further to a lower side than the front side main chamber, so as to straddle above and below a door belt line of a front side door.

* * * * *